United States Patent
Seigel et al.

(10) Patent No.: US 9,992,283 B2
(45) Date of Patent: Jun. 5, 2018

(54) PROVIDING A SINGLE INTERFACE FOR ACCESSING RESOURCES THAT ARE DISTRIBUTED AMONG MULTIPLE PLATFORMS

(71) Applicant: Quest Software Inc., Aliso Viejo, CA (US)

(72) Inventors: Jake Seigel, Dartmouth (CA); Derek Jury, Beachville (CA)

(73) Assignee: Quest Software Inc., Aliso Viejo, CA (US)

( * ) Notice: Subject to any disclaimer, the term of this patent is extended or adjusted under 35 U.S.C. 154(b) by 323 days.

(21) Appl. No.: 15/019,756

(22) Filed: Feb. 9, 2016

(65) Prior Publication Data

US 2017/0230458 A1    Aug. 10, 2017

(51) Int. Cl.
*G06F 15/16*    (2006.01)
*H04L 29/08*    (2006.01)

(52) U.S. Cl.
CPC .......... *H04L 67/1097* (2013.01); *H04L 67/02* (2013.01); *H04L 67/06* (2013.01)

(58) Field of Classification Search
CPC ...... H04L 67/1097; H04L 67/02; H04L 67/06
See application file for complete search history.

(56) References Cited

U.S. PATENT DOCUMENTS

| | | | | |
|---|---|---|---|---|
| 8,503,619 | B2* | 8/2013 | Baker | H04M 1/642 379/265.01 |
| 8,548,959 | B2* | 10/2013 | Wang | G06F 11/1469 707/679 |
| 9,304,662 | B2* | 4/2016 | Beveridge | G06F 3/0484 |
| 9,311,188 | B2* | 4/2016 | Wang | G06F 11/1469 |
| 9,785,644 | B2* | 10/2017 | Lam | G06F 17/30159 |
| 2012/0089578 | A1* | 4/2012 | Lam | G06F 17/30159 707/692 |
| 2012/0136831 | A1* | 5/2012 | Wang | G06F 11/1469 707/640 |
| 2014/0095451 | A1* | 4/2014 | Wang | G06F 11/1469 707/679 |
| 2016/0364200 | A1* | 12/2016 | Beveridge | G06F 3/1454 |
| 2016/0364201 | A1* | 12/2016 | Beveridge | G06F 3/1454 |

* cited by examiner

*Primary Examiner* — Moustafa M Meky
(74) *Attorney, Agent, or Firm* — Kirton McConkie; Brian Tucker

(57) ABSTRACT

A single interface can be provided for accessing resources that are distributed among multiple platforms. Resources that are stored in different platforms and to which a user should have access can be identified. A stub can be created for each identified resource and can include functionality for causing the resource to be opened when the stub is selected. These stubs can then be combined in a single folder or other type of user interface where they can be selected to cause the corresponding resource to be opened.

20 Claims, 7 Drawing Sheets

PROVIDING A SINGLE INTERFACE FOR ACCESSING RESOURCES THAT ARE DISTRIBUTED AMONG MULTIPLE PLATFORMS

CROSS-REFERENCE TO RELATED APPLICATIONS

N/A

BACKGROUND

In large enterprise environments, it is normal for resources to be scattered over multiple platforms. For example, a user could have documents residing on their workstation, on a shared file server, on a network attached storage device, multiple SharePoint sites, or any form of cloud storage. Managing all of the documents scattered across these platforms becomes difficult as the number of documents and platforms increases.

BRIEF SUMMARY

The present invention extends to methods, systems, and computer program products for providing a single interface for accessing resources that are distributed among multiple platforms. Resources that are stored in different platforms and to which a user should have access can be identified. A stub can be created for each identified resource and can include functionality for causing the resource to be opened when the stub is selected. These stubs can then be combined in a single folder or other type of user interface where they can be selected to cause the corresponding resource to be opened.

In some embodiments, the present invention is implemented, by an agent executing on a user computing device, as a method for enabling resources stored in one or more platforms to be accessed via a single interface. The agent receives, for each of a number of resources, information defining a location where the resource is stored. For each of the number of resources, the agent creates a stub. Each stub comprises a file that is associated with the agent such that the agent is invoked when the stub is selected. Each stub also includes either the information defining the location where the resource is stored or a representation of the information that can be employed to retrieve the information. The agent then presents each of the stubs within an interface of the user computing device.

In other embodiments, the present invention is implemented as one or more computer storage media storing computer executable instructions which when executed by one or more processors of a user computing device implement a method for allowing resources that are distributed among a plurality of different platforms to be accessed via a common local interface. The method includes: creating, by an agent executing on the user computing device, a number of stubs, each stub including information identifying a location of a corresponding resource on one or more plurality of different platforms; causing the number of stubs to be displayed within the common local interface; and in response to user selection of one of the stubs, employing the information included in the selected stub to open a copy of the corresponding resource.

In other embodiments, the present invention is implemented as a system that includes: one or more resource storage agents configured to execute on one or more storage platforms to identify a perceived owner of resources stored on the storage platforms and to communicate information identifying the resources to a local agent; and the local agent that is configured to receive the information identifying the resources and create a stub for each of the resources, each stub including location information for the corresponding resource. The local agent is further configured to receive an indication that a particular stub has been selected, and in response, obtain the location information from the particular stub and employ the location information obtained from the particular stub to open the corresponding resource.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
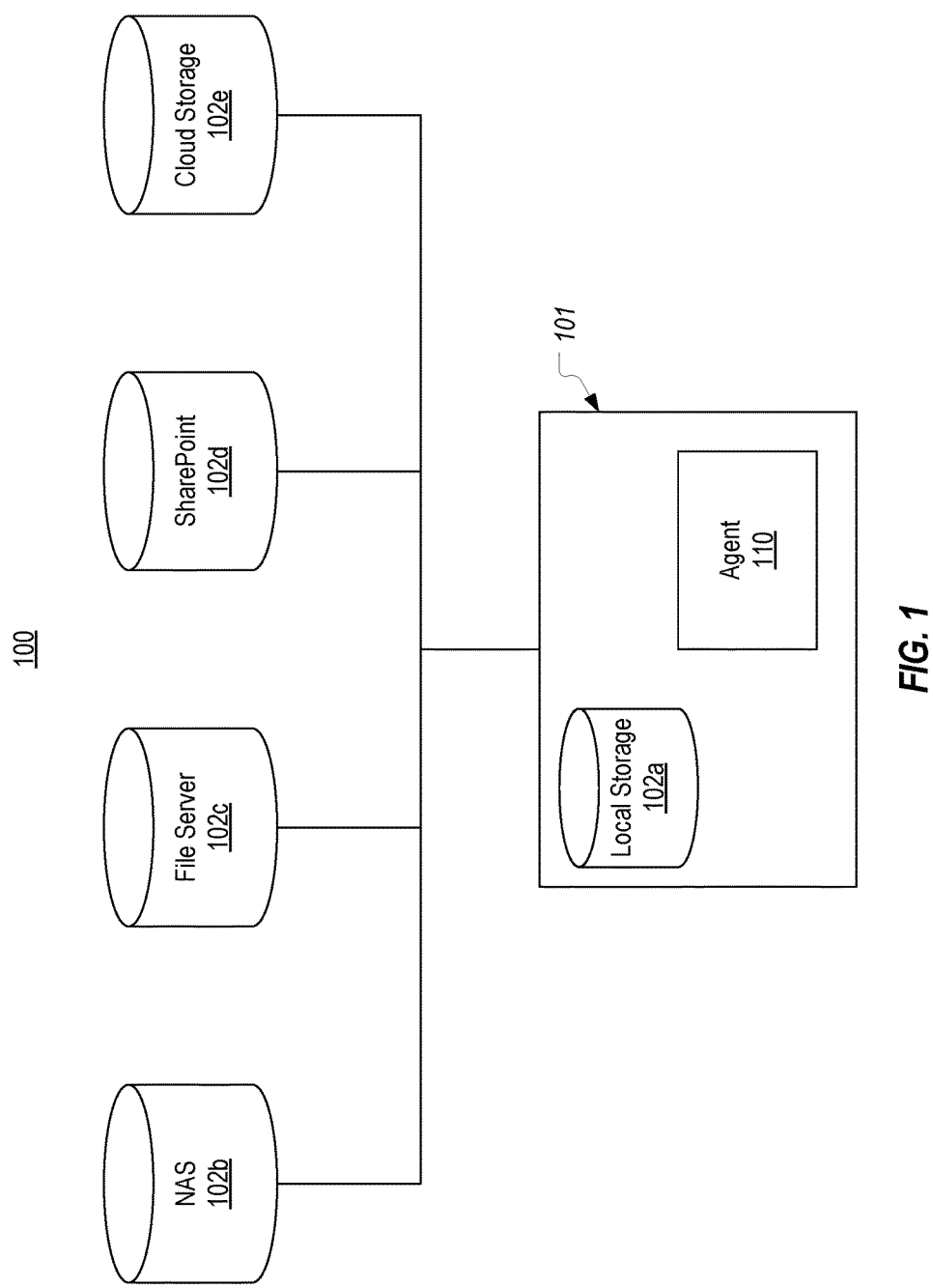
FIG. 1 illustrates an example computing environment in which the present invention can be implemented and that includes a user computing device and a number of resource storages accessible to the user computing device.

FIG. 1 illustrates an example computing environment 100 in which the present invention can be implemented. Computing environment 100 includes a user computing device 101 that includes local storage 102a and an agent 110. User computing device 101 is coupled to a number of different types of resource storages including network attached storage (NAS) 102b, a shared file server 102c, a SharePoint site 102d, and cloud storage 102e (e.g., Google Drive, Microsoft OneDrive, Apple iCloud Drive, Dropbox, etc.). Each of resource storages 102a-102e provides a different platform (i.e., a different manner and/or location) for storing resources.

In this specification, a resource should be construed as any type of file that can be accessed from a computing device. For example, resources will typically include Microsoft Office documents, PDFs, graphic files, video files, audio files, or any of the other various types of files that are commonly accessed on a computing device. Accordingly, the present invention should not be limited to any particular type of resource.

As introduced in the Background, if a user stores or otherwise has access to many resources in each of resource storages 102a-102e, it can become difficult to manage all of the resources since different and independent access techniques are required for each resource storage. However, in accordance with embodiments of the present invention, agent 110 can be employed to create a single interface through which the user may access any of the resources in a common way regardless of where they are stored.

Because each of resource storages 102b-102e will typically store a large number of resources and because a user will typical only own or have access to a subset of the resources, each resource storage 102b-102e can include an agent (not shown) that is configured to identify which resources a particular user should be provided access to within the single interface. For purposes of this disclosure, these agents could make this determination based on a number of different criteria. For example, the agents may be configured to identify only resources that the user authored. Alternatively, the agents may be configured to identify any resources that the user or a group to which the user belongs has access to. In other embodiments, the agents may attempt to identify a perceived owner for each resource and then make the resource available to this perceived owner. In any case, a preliminary step can be performed to identify which resources (including possibly all resources) a user should be provided access to via the single interface.

In FIG. 1, it is assumed that the user's local resources may also be included in the single interface. However, this need not be the case. In particular, in some embodiments, the single interface may aggregate only resources from non-local resource storages. However, in implementations where local resources are included (or at least considered for inclusion), agent 110 can function to identify which local resources should be included.

Figure 2:
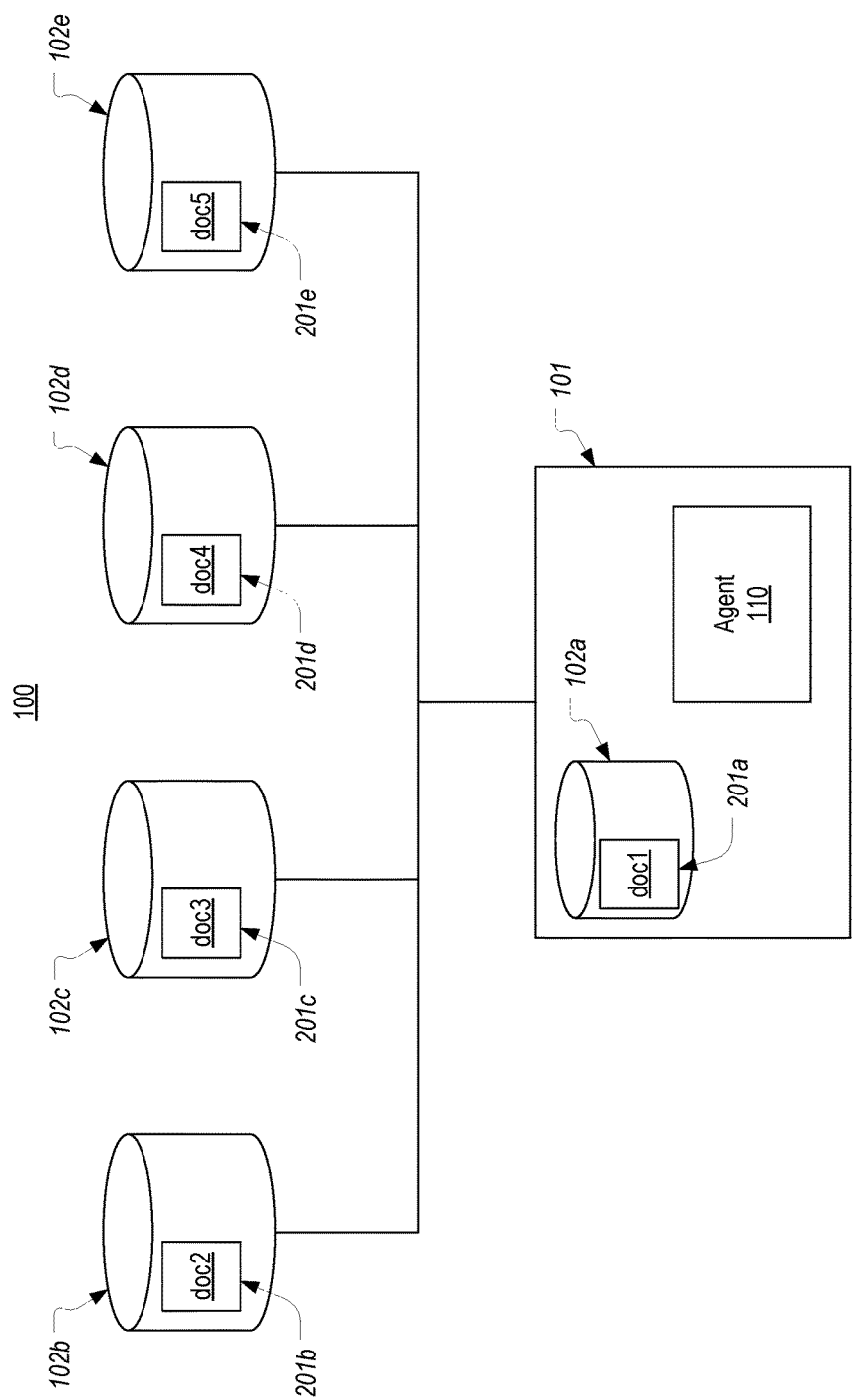
FIG. 2 illustrates an example where each resource storage stores a single resource pertaining to a user of the user computing device.
Figure 3:
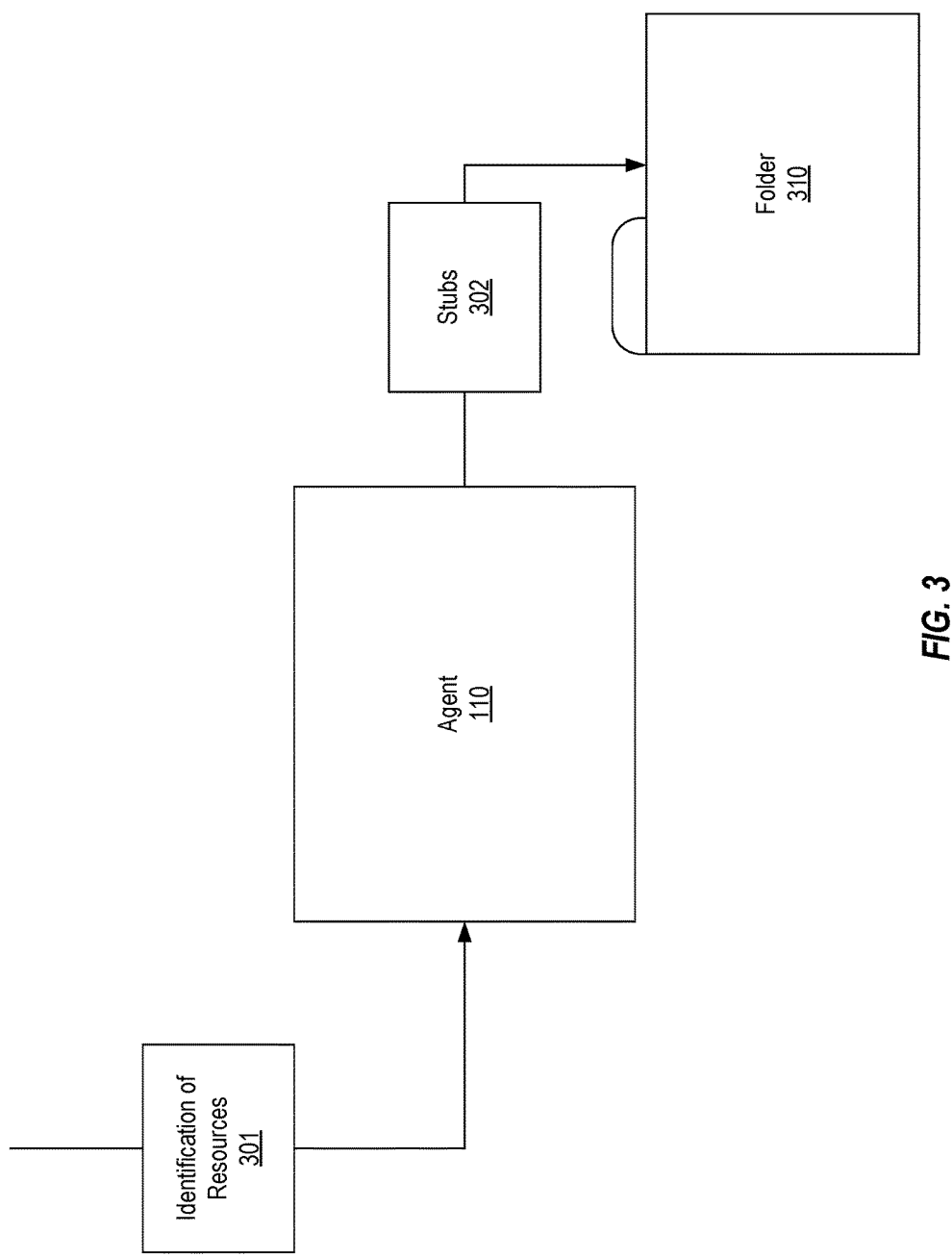
FIG. 3 illustrates how an agent executing on the user computing device can receive an identification of resources that pertain to the user and can create stubs for each of the identified resources.

FIG. 2 represents a simplified case where it is assumed that a single resource on each of resource storages 102a-102e has been identified for inclusion in the single interface to be provided to the user. These resources will be referred to as resources 201a-201e respectively and are assumed to be named doc1, doc2, doc3, doc4, and doc5 respectively. Accordingly, FIG. 3 depicts that an identification 301 of these resources can be provided to agent 110 (i.e., to the local agent). Identification 301 can represent the combination of identifications that would be received from the agents operating within the different resource storage platforms. Of course, agent 110 will have also identified resource 201a which is stored locally.

Identification 301 can generally represent any information that would be necessary for agent 110 to download a copy of or otherwise access the corresponding resources. For example, if a resource storage provides access to resources via HTTP URLs, identification 301 can include such URLs. Similarly, if a resource storage provides access to resources via a file system path, identification 301 can include such paths. In some embodiments, identification 301 may also include a name and type of each resource.

Agent 110 can receive identification 301 and generate a stub for each identified resource (collectively, stubs 302). Agent 110 can then store stubs 302 in a folder 310 or other location where the user can view and access the stubs. Folder 310 represents the typical folder interface of the Microsoft Windows operating system to indicate that the stubs can be stored and accessed in a common manner.

Figure 4:
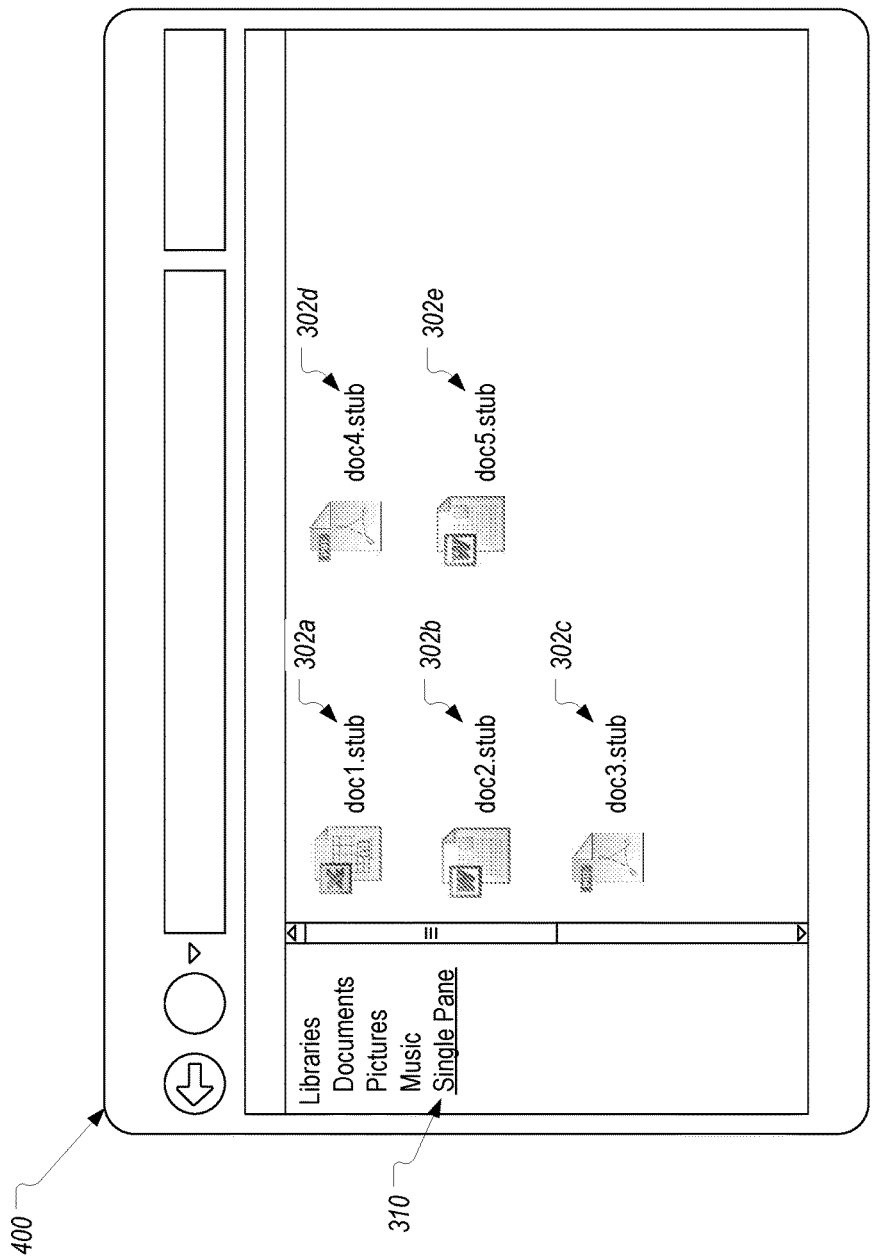
FIG. 4 illustrates an example interface in which a number of stubs are displayed.

For example, FIG. 4 illustrates a typical Windows folder interface 400 within which five stubs 302a-302e are displayed. Stubs 302a-302e are assumed to have been generated for resources 201a-201e respectively. As shown, agent 110 has created a folder 310 (which is assumed to be titled "Single Pane" and stored under the Libraries folder) that the user can select to view all of the stubs that agent 110 has created.

Each of stubs 302 can be given the same name as its corresponding resource and can be given an extension that corresponds to agent 110. In this example and for illustrative purposes, this extension is assumed to be .stub. Also, for illustrative purposes, an icon is shown next to the name of the stub which indicates the type of the resource to which the stub corresponds. For example, agent 110 has created a stub file named doc5.stub that corresponds to resource 201e which is assumed to be a Word document. By including these icons, the user may easily identify what type of resource each stub represents.

Although stubs 302 are displayed in a manner that causes them to appear to be the actual resources, each stub only contains the necessary information for obtaining the corresponding resource. In other words, agent 110 can make it appear to the user as if all of the resources are stored locally even though the resources are actually distributed among the various storage platforms.

Figure 5:
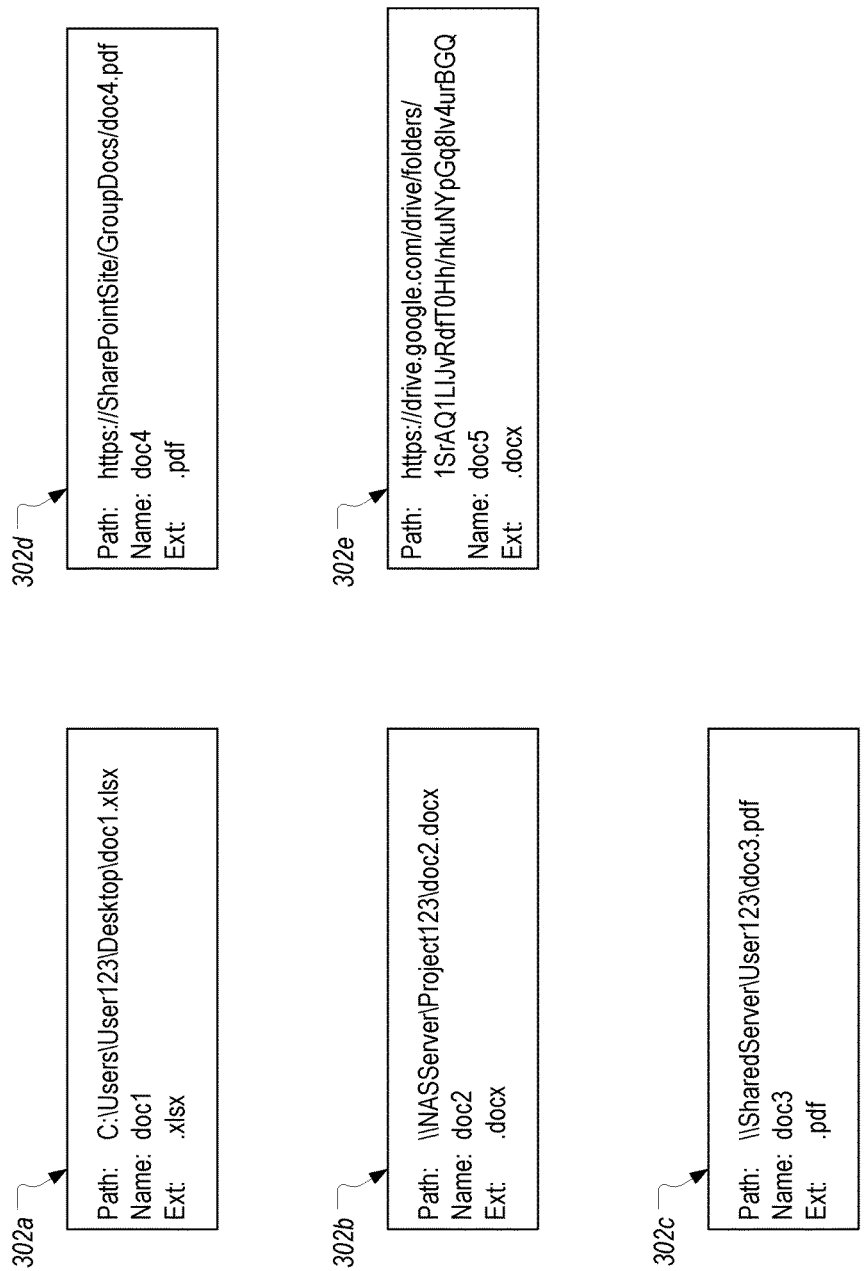
FIG. 5 illustrates examples of the contents of various stubs.

FIG. 5 illustrates examples of the type of information that may be included within each of stubs 302a-302e. In each stub, a path (or location) for obtaining the corresponding resource is defined. For example, in the case of stub 302a which corresponds to resource 201a stored locally, the defined path is a local path. In contrast, in the case of stubs 302b and 302c which correspond to resources 201b and 201c stored on NAS 102b and file server 102c respectively, the defined path is a network path. In the case of stubs 302d and 302e which correspond to resources 201d and 201e stored on SharePoint site 102d and cloud storage 102e respectively, the defined path is a URL. In some embodiments, the path defined in each stub 302 can be encrypted.

In addition to defining the path to the corresponding resource, each stub 302 may also define the name of the resource and its extension. Defining the name and the extension facilitates the creation of folder 310. For example, in some cases, the path to the resource may not include an identification of the name and extension of the resource such as when the resource is stored in cloud storage 102e. Accordingly, agent 110 can receive the path, name, and extension of each resource and can create a corresponding stub that contains these three pieces of information.

Although FIG. 5 depicts an example where the information for locating the resource is contained within the stub itself, in some embodiments, agent 110 may maintain a separate data structure for storing this information. In such cases, each stub may include an identifier or representation that can be used to retrieve the corresponding information from the separate data structure. In each of these instances, the stubs should be construed as containing information defining a location where the corresponding resource is stored.

Once stubs 302 are created, the user can navigate to folder 310 and select a stub as if it were the corresponding resource. In response, agent 110 can perform the necessary steps to obtain and open the corresponding resource. Therefore, from the user's perspective, these resources are opened in the same manner as if the user had directly selected the resource from local storage.

Figure 6:
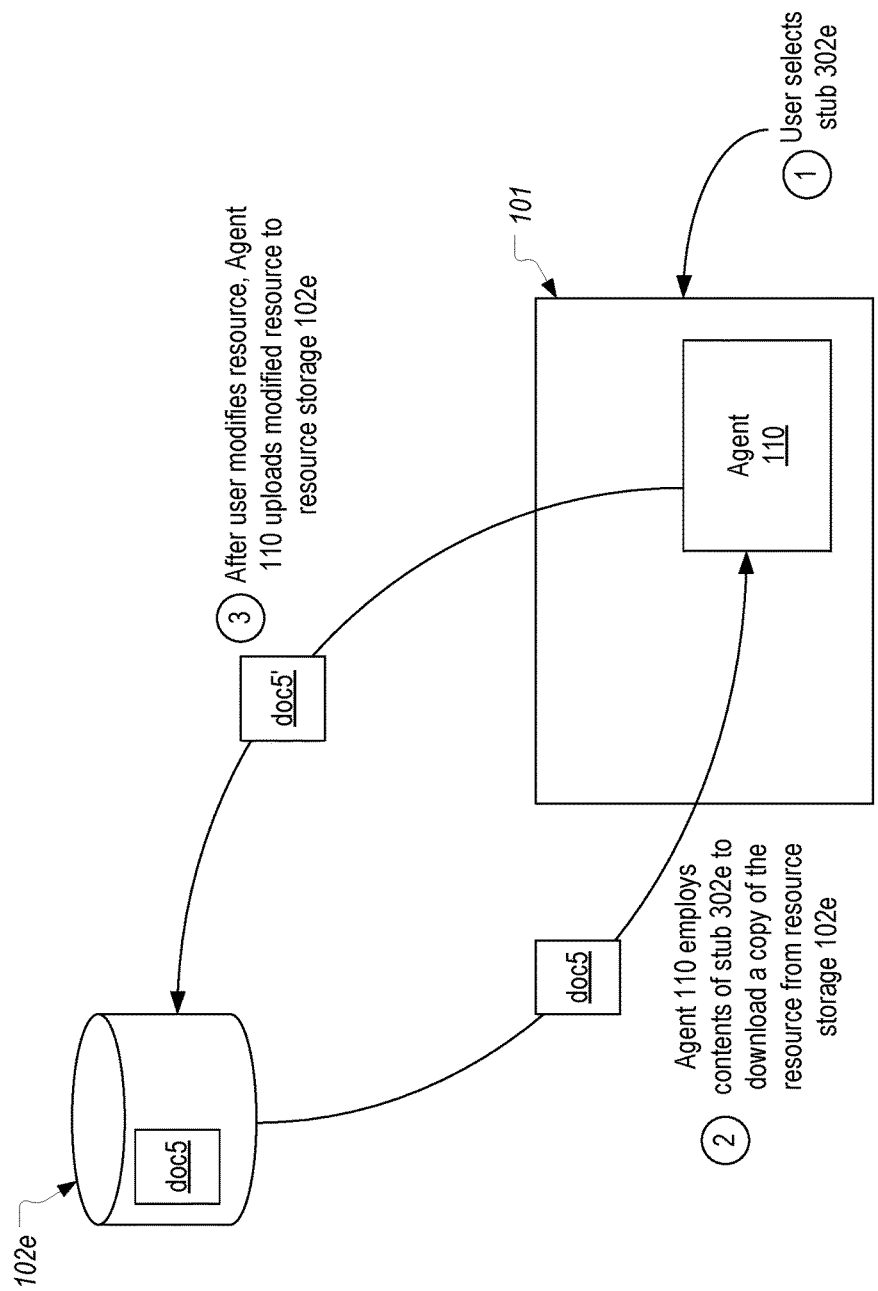
FIG. 6 illustrates how the agent accesses a resource using information obtained from a selected stub.

FIG. 6 illustrates an example of the steps that agent 110 can perform to obtain a copy of a corresponding resource when a stub is selected. In step 1, it is assumed that the user has selected stub 302e. For example, the user can double click on the visual display of stub 302e within folder 310. Because stub 302e is of type .stub and agent 110 is the specified file handler for .stub files, the operating system will route the selection of stub 302e to agent 110. In response, in step 2, agent 110 can employ the information within stub 302e (i.e., the path https://drive.google.com/drive/folders/1SrAQ1LIJvRdfT0Hh/nkuNYpGq8Iv4urBGQ) to download a copy of the corresponding resource which in this case is doc5.docx and to cause this document to be opened by Microsoft Word. The user can then interact with the document in a standard manner. In step 3, after the user has closed the document, agent 110 can again employ the information within stub 302e to upload a modified copy of the document (which is represented as doc5' in FIG. 6) to resource storage 102e. This downloading and uploading of the resource can be performed in a manner that is substantially transparent to the user.

In some cases, it may not be necessary for agent 110 to download a copy of the corresponding resource. For example, resources 201a-201c are each stored in a way that allows the resource to be opened directly from resource storages 102a-102c (e.g., via direct file system access or via a network file sharing protocol). In such cases, agent 110 may employ the information within stubs 302a-302c to open the corresponding resource from its location on the resource storage.

In some embodiments, agent 110 may also be configured to perform authentication on behalf of the user when the user selects a stub. For example, one or more of resource storages 102a-102e may require that the user authenticate prior to obtaining access to the resources. If the user were required to manually perform this authentication after selecting a stub, it would minimize the perception that the resources are aggregated into a single interface. Accordingly, agent 110 can include functionality for authenticating the user in a substantially transparent manner. For example, agent 110 may maintain a mapping between a stub and the authentication information required to access the corresponding resource. In some cases, this authentication information may even be stored within the stub. In any case, when a user selects a stub, agent 110 can obtain the required authentication information (e.g., username/password, digital certificate, etc.) and perform the necessary interactions with the resource storage to authenticate the user and then open the resource. In some cases, agent 110 may be configured to perform an automatic single sign on to all resource storages whenever the user selects a stub or otherwise requests authentication. By performing single sign on, agent 110 can further create the perception that the resources are physically stored in the same location.

In some embodiments, agent 110 can be controlled from a central location. For example, in a company, agent 110 may be installed on each employees computing device to perform the functionality described above to aggregate the employee's resources into a single interface. An administrator of the company may then employ a management agent to control the operation of agent 110 on any particular employee's computing device. For example, if it were desired to cut off an employee's access to resources, the administrator could instruct agent 110 to immediately upload and/or close any resources and prevent further access to the resources. Similarly, if it were desired to cut off any employee's access to a particular resource, the administrator could instruct each instance of agent 110 to upload the particular resource if the agent has downloaded a copy of it and prevent further access to the particular resource.

In some embodiments, it may be preferred to only allow resources to be stored in a non-local resource storage. For example, if an employee were only allowed to store resources in resource storages 102b-102e and not in resource storage 102a, it would be easier to perform a backup of the resources and to secure the resources since the resources would not be distributed among a number of client computing devices, but doing so would increase the complexity of accessing the resources. However, by implementing the techniques of the present invention, the employee can still be provided with an interface that groups his or her resources in a manner that makes them appear as if they were stored locally. Accordingly, the present invention can facilitate management of resources without unduly burdening the end user.

Because a stub is a separate file and contains information for locating a corresponding resource, stubs can be manipulated like other types of files. For example, a user may move stubs from one folder to another on user computing device 101. Even if a stub is moved, the selection of a stub will still invoke agent 110 so that the corresponding resource can be opened. In some embodiments, agent 110 may allow a stub to be renamed and may then propagate the new name back to the resource storage where the corresponding resource is stored. In this way, resources can be renamed using standard file system conventions even though the resources are stored in varying resource storages.

In summary, the present invention can be implemented to aggregate resources across multiple platforms and make them available in a local file browser as if the resources were actually stored locally. This perception of local access is created by using a stub to represent each resource. The steps required to obtain the actual resource can be abstracted from the end user by employing the local agent to process the contents of a stub.

Figure 7:
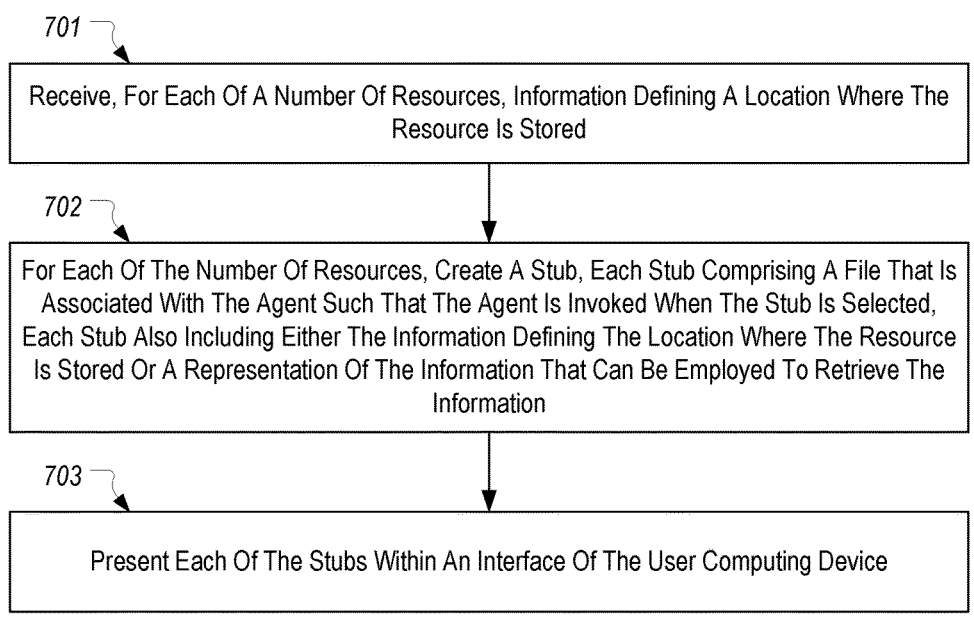
FIG. 7 illustrates a flowchart of an example method for enabling resources stored in one or more platforms to be accessed via a single interface.

FIG. 7 provides a flowchart of an example method 700 for enabling resources stored in one or more platforms to be accessed via a single interface. Method 700 can be implemented by agent 110 executing on user computing device 101.

Method 700 includes an act 701 of receiving, for each of a number of resources, information defining a location where the resource is stored. For example, agent 110 can receive information from an agent associated with one or more of resource storages 102b-102e identifying one or more resources stored on the resource storage that pertain to the user of user computing device 101.

Method 700 includes an act 702 of, for each of the number of resources, creating a stub, each stub comprising a file that is associated with the agent such that the agent is invoked when the stub is selected, each stub also including either the information defining the location where the resource is stored or a representation of the information that can be employed to retrieve the information. For example, agent 110 can create stubs 302a-302e corresponding to resources 201a-201e.

Method 700 includes an act 703 of presenting each of the stubs within an interface of the user computing device. For example, agent 110 can cause stubs 302a-302e to be displayed within folder 310

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method implemented by an agent executing on a user computing device for enabling resources stored in one or more platforms to be accessed via a single interface, the method comprising:
   receiving, for each of a number of resources, information defining a location where the resource is stored;
   for each of the number of resources, creating a stub, each stub comprising a file that is associated with the agent such that the agent is invoked when the stub is selected, each stub also including either the information defining the location where the resource is stored or a representation of the information that can be employed to retrieve the information; and
   presenting each of the stubs within an interface of the user computing device.

2. The method of claim 1, wherein the number of resources are distributed among a plurality of platforms.

3. The method of claim 1, wherein the plurality of platforms include one or more of local storage, a network attached storage, a shared file server, a SharePoint site, or cloud storage.

4. The method of claim 1, wherein the information defining the location where the resource is stored comprises a path to the resource.

5. The method of claim 4, wherein each path is one of a local path, a network path, or a URL.

6. The method of claim 5, wherein each stub stores the path to the corresponding resource.

7. The method of claim 5, wherein each stub stores a representation that can be employed to obtain the path to the corresponding resource from a separate data structure.

8. The method of claim 1, wherein the interface of the user computing device comprises a file explorer.

9. The method of claim 1, further comprising:
   receiving user input that selects a particular stub;
   accessing the stub to obtain the information defining the location where the particular resource is stored; and
   employing the information to download or open the resource.

10. The method of claim 9, wherein the resource is downloaded, the method further comprising:
    employing the information to upload the resource.

11. The method of claim 1, further comprising:
    storing authentication information for at least one of the one or more platforms; and
    authenticating a user of the user computing device to the at least one of the one or more platforms.

12. The method of claim 11, wherein the user is authenticated in response to the user selecting one of the stubs.

13. The method of claim 11, wherein the one or more platforms comprise a plurality of platforms and the user is authenticated to at least two of the plurality of platforms in response to the user selecting one of the stubs.

14. The method of claim 1, wherein each stub also includes a name and an extension of the resource.

15. One or more computer storage media storing computer executable instructions which when executed by one or more processors of a user computing device implement a method for allowing resources that are distributed among a plurality of different platforms to be accessed via a common local interface, the method comprising:
    creating, by an agent executing on the user computing device, a number of stubs, each stub including information identifying a location of a corresponding resource on one or more plurality of different platforms;
    causing the number of stubs to be displayed within the common local interface; and
    in response to user selection of one of the stubs, employing the information included in the selected stub to open a copy of the corresponding resource.

16. The computer storage media of claim 15, wherein the information included in each stub comprises one of a network path or a URL.

17. The computer storage media of claim 15, wherein at least some of the stubs also include a name and an extension of the corresponding resource.

18. The computer storage media of claim 15, wherein the copy of the corresponding resource is downloaded to the user computing device and then opened, the method further comprising:
    uploading the copy of the corresponding resource after the corresponding resource has been closed.

19. The computer storage media of claim 15, wherein the information comprises a path to the corresponding resource that is stored in the stub or information for obtaining the path to the corresponding resource that is stored in a separate data structure.

20. A system comprising:
one or more resource storage agents configured to execute on one or more storage platforms to identify a perceived owner of resources stored on the storage platforms and to communicate information identifying the resources to a local agent; and
the local agent that is configured to receive the information identifying the resources and create a stub for each of the resources, each stub including location information for the corresponding resource, the local agent being further configured to receive an indication that a particular stub has been selected, and in response, obtain the location information from the particular stub and employ the location information obtained from the particular stub to open the corresponding resource.

* * * * *